United States Patent
Zerangue, Sr.

(10) Patent No.: US 6,712,102 B2
(45) Date of Patent: Mar. 30, 2004

(54) METHOD AND SYSTEM FOR PREVENTING VEHICLE MISFUELLING

(76) Inventor: Russell Shane Zerangue, Sr., P.O. Box 1608, Hammond, LA (US) 70404-1608

( * ) Notice: Subject to any disclaimer, the term of this patent is extended or adjusted under 35 U.S.C. 154(b) by 0 days.

(21) Appl. No.: 10/140,686

(22) Filed: May 7, 2002

(65) Prior Publication Data

US 2003/0209280 A1 Nov. 13, 2003

(51) Int. Cl.[7] .................................................. B65B 1/04

(52) U.S. Cl. ............................. 141/83; 141/1; 141/96; 141/196; 340/632; 220/86.2; 73/29.01

(58) Field of Search ......................... 141/1, 83, 94–96, 141/192, 196; 73/23.2, 29.01; 340/632; 220/86.1, 86.2, 86.3

(56) References Cited

U.S. PATENT DOCUMENTS

| | | | |
|---|---|---|---|
| 4,838,323 A | 6/1989 | Watts | |
| 5,209,275 A | 5/1993 | Akiba et al. | |
| 5,309,957 A | 5/1994 | Saisuu | |
| 5,654,497 A | 8/1997 | Hoffheins et al. | |
| 5,722,469 A | 3/1998 | Tuminaro | |
| 6,341,629 B1 * | 1/2002 | Clark et al. | 141/83 |

* cited by examiner

Primary Examiner—J Casimer Jacyna
(74) Attorney, Agent, or Firm—Roy, Kiesel, Keegan and DeNicola

(57) ABSTRACT

A method and system for preventing vehicle misfuelling by utilizing an apparatus that receives a fuel nozzle into the filler neck, and activates a vacuum on the nozzle inserted therein. Using the pump's internal shut-off mechanism, this prevents the fuel pump from dispensing fuel until the sensing unit within the apparatus is able to identify the fuel proposed to be added to the tank. If the fuel is deemed acceptable, the vacuum is released, and the fuel is permitted to enter into the desired fuel tank.

14 Claims, 4 Drawing Sheets

METHOD AND SYSTEM FOR PREVENTING VEHICLE MISFUELLING

BACKGROUND OF THE INVENTION

The present invention relates to a method and system of preventing the addition of the wrongtype of fuel to a fuel tank, by monitoring the vapor pressure of the fuel being added, and if detected as the incorrect fuel, shutting off the supply by activating the fuel pump's shutoff via maintaining a vacuum on the fuel nozzle or by inducing increased back pressure in the fuel tank.

Because of differing types of fuel being offered at filling stations, it is frequent that the wrong type of fuel will be added to a vehicle's tank. Particularly troublesome is the confusion between diesel and gasoline fuels, which because of their chemical properties, are not interchangeable. Furthermore, the addition of the wrong type of fuel will not only fail to power the vehicle, but also exposes the engine to the possibility of serious damage.

Various methods have been implemented to prevent the confusion of the fuels, including the manufacture of diesel fuel nozzles and filler necks being a larger diameter than their gasoline counterparts. This works relatively well for automotive use, since the fuel aperture in gasoline-powered cars are intentionally narrower as to prevent the introduction of a diesel nozzle into the filler neck. However, the converse is not true. Diesel filler necks readily accept the smaller gasoline filler nozzle, and so without proper attention, large amounts of money can be lost on an oversight when the wrong fuel is added to an engine and causes is to malfunction, or in some cases, to injure those who may be in the proximity.

The present invention alleviates this problem by effectively preventing the addition of any type of fuel that can be identified by vapor pressure from being added to a properly equipped fuel tank. Additionally, having such a device capable of being retrofitted to current vehicles enables end users to equip their own vehicles, rather than relying upon filling stations to retrofit their pumps with a similar system.

OBJECTS AND SUMMARY OF THE INVENTION

One objective of this invention is to provide a device that identifies a fuel by vapor pressure and then selectively maintain a vacuum and/or controls a valve to prevent the addition of an undesired fuel to a fuel tank.

Another objective of this invention is to identify a fuel by vapor pressure, and to increase the back pressure in a fuel tank to engage the fuel pump's internal shut-off if the fuel being added does not match the specified fuel to be added to the tank.

Still another objective of this invention is to fill a long felt need in the art for a such devices, since as far as is known, there is no such device or method for automatically preventing the addition of incorrect fuel based on a receiving-side monitoring system.

Still another objective of the invention is to provide a method to prevent the addition of any fuel not matching the appropriate vapor pressure by applying a vacuum to a fuel nozzle or increasing back pressure inside the fuel tank, thus engaging the fuel pump's automatic shut-off.

Other objects and advantages of this invention shall become apparent from the ensuing descriptions of the invention.

According to the present invention, the apparatus receives a fuel nozzle into the filler neck, and activates a vacuum on the nozzle inserted therein. Using the pump's internal shut-off mechanism, this prevents the fuel pump from dispensing fuel until the sensing unit within the apparatus is able to identify the fuel proposed to be added to the tank. If the fuel is deemed acceptable, the vacuum is released, and the fuel is permitted to enter into the desired fuel tank.

DESCRIPTION OF THE DRAWINGS

The accompanying drawings illustrate a preferred embodiment of this invention. However, it is to be understood that this embodiment is intended to be neither exhaustive, nor limiting of the invention. They are but examples of some of the forms in which the invention may be practiced.

DETAILED DESCRIPTION OF THE PREFERRED EMBODIMENT

Figure 1:
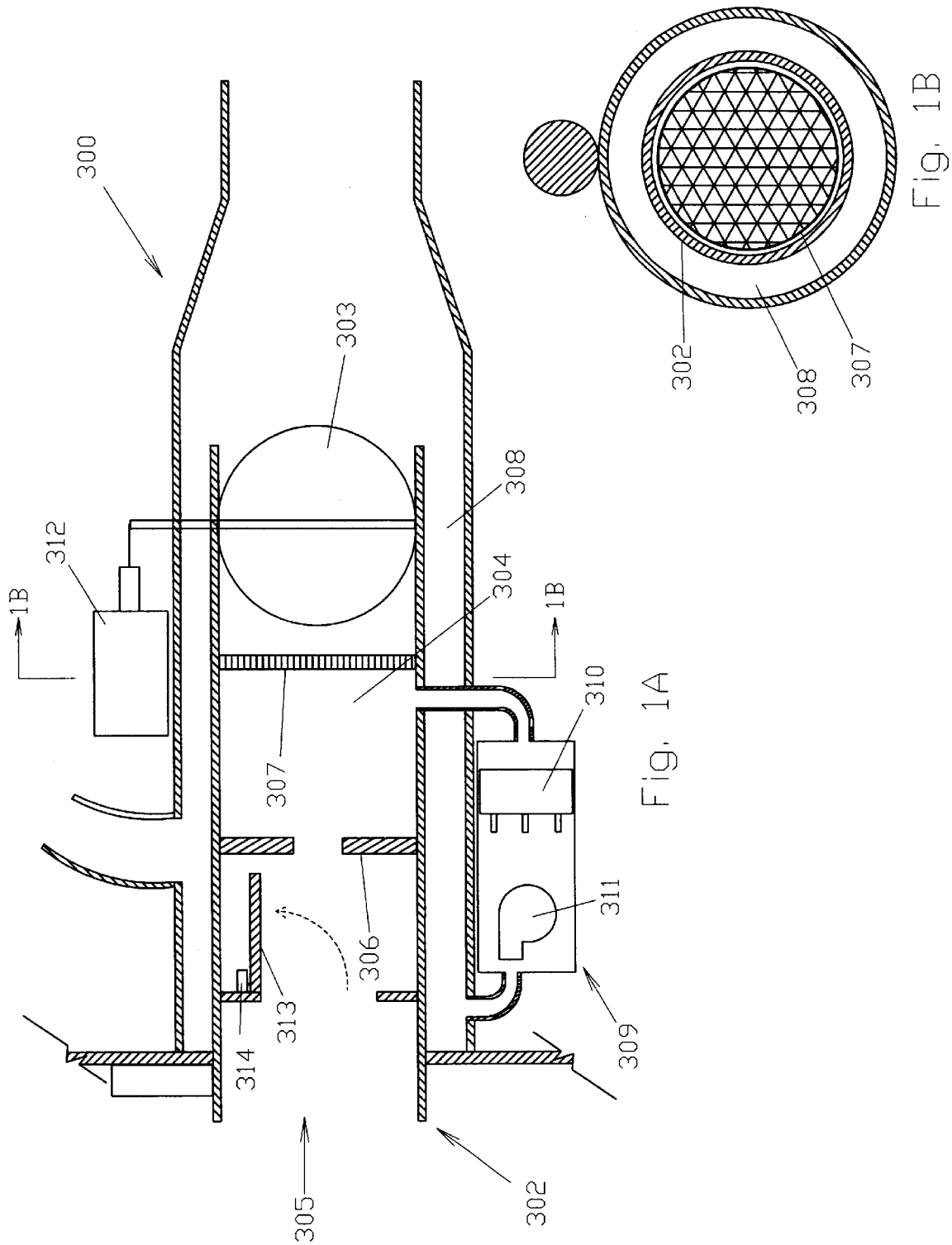
FIG. 1A shows cutaway view of the fuel detection assembly.
FIG. 1B shows a front view of the valve screen in FIG. 1A.
Figure 2:
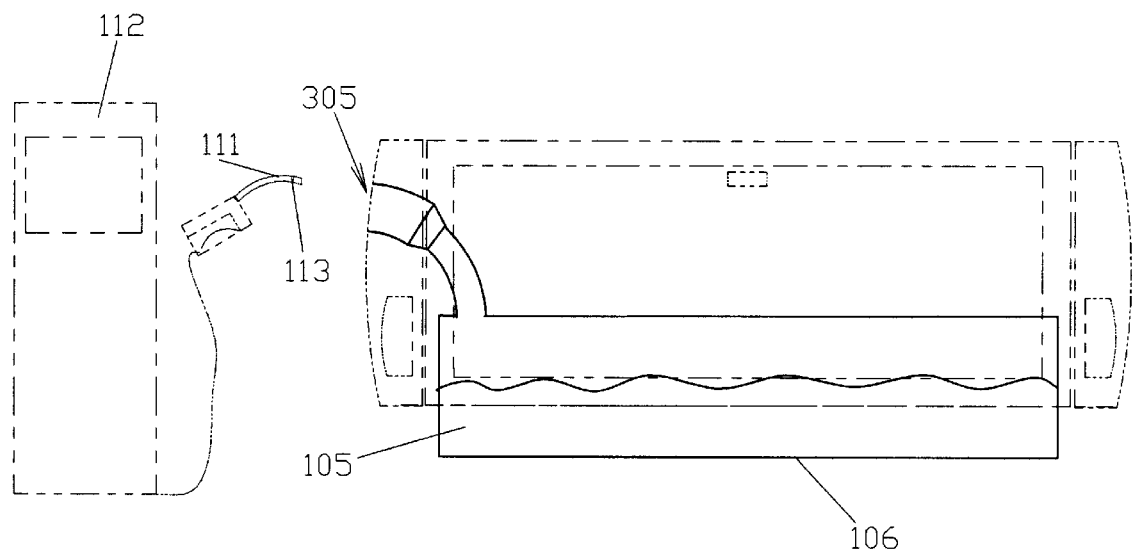
FIG. 2 shows a landscape view of a vehicle being fuelled.

Without any intent to limit the scope of this invention, reference is made to the figures in describing the preferred embodiments of the invention. Referring to FIGS. 1 and 2, apparatus 300 is used to sense the type of fuel being added to fuel tank 106. Fuel tank 106 can be one of many types, such as that of a motor vehicle, aircraft, spacecraft, watercraft, free standing tank or any other vessel used to store fuel. Fuel 105 can be gasoline, diesel, aviation fuel, rocket fuel, or any other type of fuel. Apparatus 300 comprises filler neck 302, where most of the device's components are located. Within filler neck 302 is chamber 304, forming cavity 308 between filler neck 302 and chamber 304. At one end of chamber 304 is valve 303 which can prevent any fuel 105 or liquid from entering fuel tank 106 when closed. The valve 303 can be operated by any number of devices, such as solenoid 312. A short distance toward the inside of chamber 304 beyond valve 303 is valve screen 307, shown in greater detail in FIG. 1B. At the opposite end of chamber 304 is the fuel nozzle aperture 305, which contains door 313, on which is mounted switch 307 314. A short distance down chamber 304 from fuel nozzle aperture 305 is gasket 306. There is also fluid passageway 309 which connects chamber 304 to cavity 308. Within fluid passageway 309 is sensing unit 310 and vacuum pump 311.

Sensing unit 310 can be any type of sensor, detector, catalyst or the like, which could be used to identify fuel 105 and relay data used to operate apparatus 300. A commercially available example of one such sensor is the Figaro TGS 813, which is capable of measuring fuel 105 vapor pressure. Another example is the Delphian Catalytic Bead Sensor, which can be employed to detect the upper or lower explosion limits of fuel 105 by measuring the exothermic energy produced by fuel 105 when it comes in contact with a catalyst. Further examples of possible sensors are infrared detectors which identify fuel 105 by passing infrared light through fuel 105, or various catalytic reactions that permit the identification of fuels.

Figure 3:
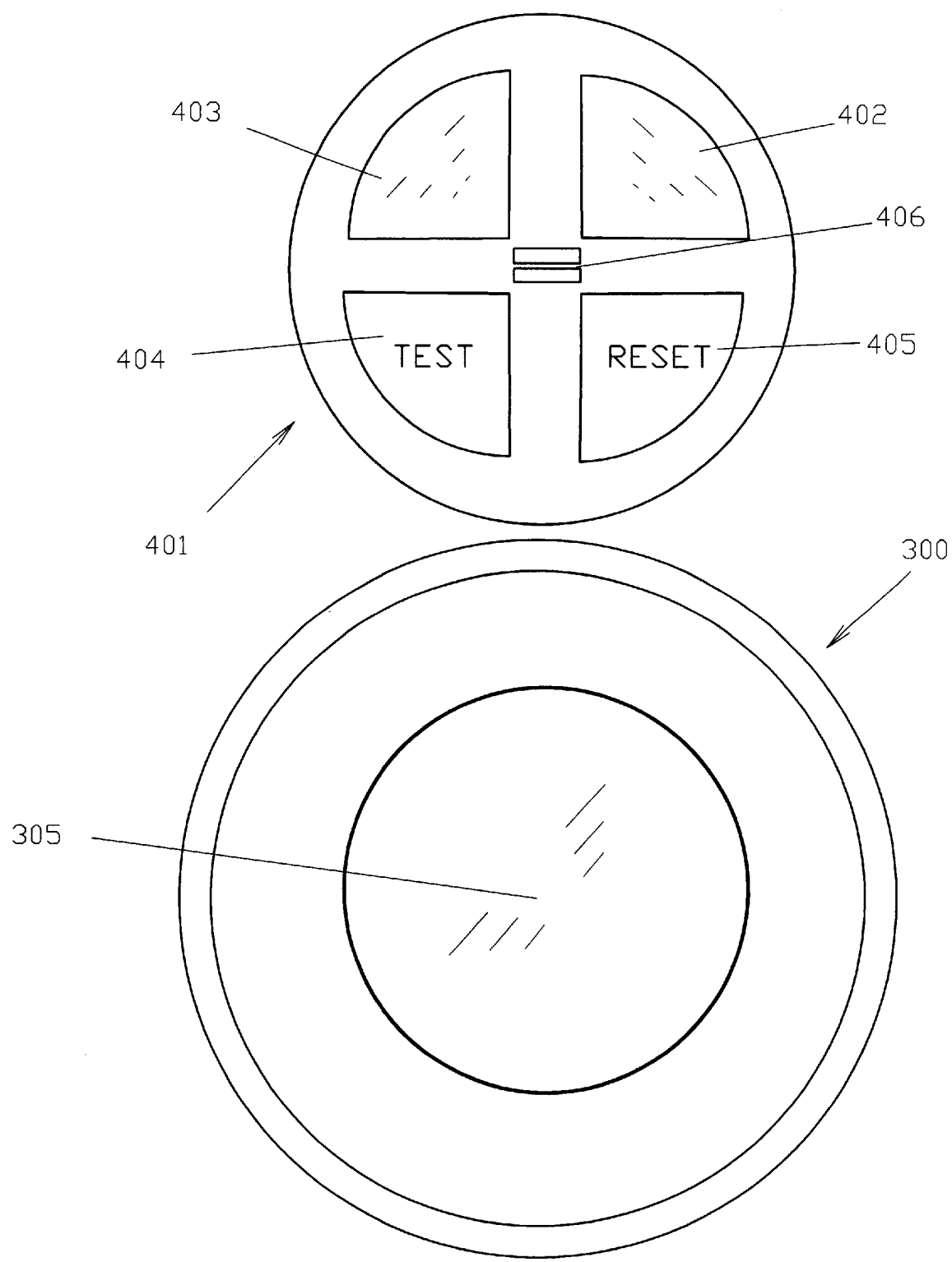
FIG. 3 shows a front view of the control panel and switches for the detection unit.

Referring to FIG. 3, an alarm unit 401 can also be employed in conjunction with apparatus 300. Alarm unit 401 can be connected to sensing unit 310, vacuum pump 311, solenoid 312, and valve 303, depending on the selected configuration. Alarm unit 401 can have various indicators and/or alarms, such as an operating indicator 402, alarm indicator 403, reset switch 404, test switch 405 and audible alarm 406.

In operation, fuel nozzle 111 is inserted into fuel nozzle aperture 305 opening door 313 and is inserted into gasket 306, which creates a seal around fuel nozzle 111. Once door 313 is opened, switch 307 activates vacuum pump 311 and closes valve 303. The seal created by gasket 306 and valve 303 encloses chamber 304 and when vacuum pump 311 is turned on, a vacuum is created within chamber 304. Generally, fuel pumps 112 are configured to shut off automatically once fuel tank 106 is full, by detecting when fuel 105 covers detection hole 113 on fuel nozzle 111. Once this occurs, fuel pump 112 ceases dispensing fuel 105. Using this concept, the vacuum created in chamber 304 achieves the same result as fuel 105 covering detection hole 113, and thus causes fuel pump 112 to shut off in a similar fashion.

Once fuel nozzle 111 is inserted into chamber 304, sensing unit 310 will be able to detect the type of fuel 105 that is being dispensed, and make a logical determination whether to open valve 303 and turn off vacuum pump 311, thus permitting fuel 105 to enter fuel tank 106. Alternately, sensing unit 310 can make the determination that fuel 105 is inappropriate, and leave valve 303 closed and keep vacuum pump 311 on to prevent any fuel from entering fuel tank 106. Audible alarm 406 can also be activated with alarm indicator 403 if so configured to indicate to the user that fuel 105 is incorrect.

Figures 4, 5:
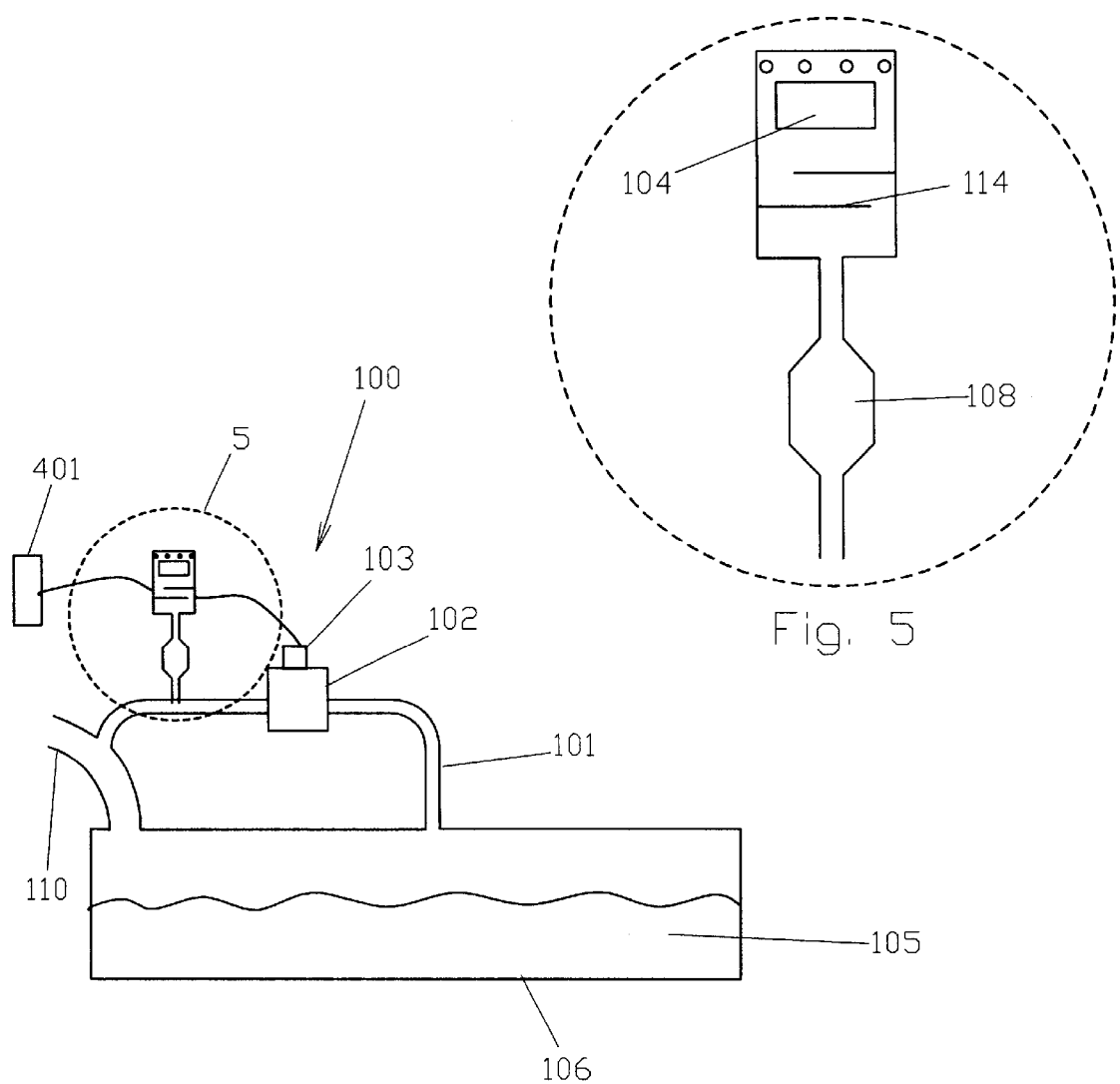
FIG. 4 shows a cutaway view of an alternate embodiment of the fuel detection assembly.
FIG. 5 shows a close-up view of the surge protector and deflector shown in FIG. 4.

Referring to FIG. 4, another embodiment, there is apparatus 100 for sensing the type of fuel being added to a fuel tank is illustrated comprising vent tube 101 which runs from the atmosphere to fuel tank 106. Vent tube 101 also has valve 102 integrated with it whose open or closed position can be controlled by actuator 103. Actuator 103 is connected or otherwise maintains communication with sensing unit 104 which can be used to measure the vapor pressure of fuel 105 being added to fuel tank 106. Actuator can be any device capable of adjusting the position of valve 102, such as solenoid 312.

Additional components can be added to increase the efficiency of apparatus 100, such as surge protector 108, which aid in preventing splashing back of fuel 105 onto sensing unit 104. Alternately, or in combination, deflector 114 can also be used for this task.

As indicated above, referring to FIG. 3, an alarm unit 401 can also be employed in conjunction with apparatus 100.

In operation, filler nozzle 111 is inserted into filler neck 110 in order to fill fuel tank 106. As fuel 105 is being dispensed, sensing unit 104 detects the identity of fuel 105 and determines if it is the proper fuel to be added to fuel tank 106. If it is determined to be the correct fuel, no action is taken. If, however, the fuel is determined to be the wrong fuel, sensing unit 104 will either directly or through any type of logical control, close valve 102. This can be accomplished using the aforementioned solenoid 312. Once valve 102 is closed, vent tube 101 is no longer vented to the atmosphere, and vapor pressure within fuel tank 106 increases rapidly, which activates the fuel pump's 112 internal shut off mechanism. This mechanism is already in place in most fuel pumps 112, as this measurement of vapor pressure is what indicates the fuel tank is full. In the present invention, fuel pump 112 is "tricked" into believing fuel tank 106 is full, thereby cutting off fuel 105 flow.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. An apparatus for sensing the type of fuel being added to a fuel tank comprising:
    (a) a filler neck sized to permit insertion of a fuel nozzle and having a passageway to permit fuel to flow from said nozzle to said fuel tank;
    (b) a valve affixed across said filler neck passageway at a position to control the flow of fuel through said filler neck to said fuel tank;
    (c) a valve actuator operatively affixed to said valve to cause said valve to open and close said passageway depending upon a signal received from a sensing unit;
    (d) a vacuum pump configured to create a vacuum within said filler neck when said valve closes said passageway;
    (e) said sensing unit operatively connected to said valve actuator and configured to measure vapor pressure of said fuel being added to said fuel tank through said filler neck, comparing said measured vapor pressure to predetermined vapor pressure values, and transmitting a signal to cause said valve actuator to open or close and to cause said vacuum pump to turn on or off depending upon the results of said comparison.

2. An apparatus for sensing the type of fuel being added to a fuel tank according to claim 1 wherein said sensing unit is operatively connected to said valve actuator and configured to measure vapor pressure of said fuel being added to said fuel tank through said filler neck, comparing said measured vapor pressure to a predetermined vapor pressure value, and causing said valve actuator to close said valve if said comparison indicates the values are above or below said predetermined vapor pressure value.

3. An apparatus for sensing the type of fuel being added to a fuel tank according to claim 2 further comprising an alarm unit comprising a visual and audible alarm indicator, operating indicator, test and reset switches.

4. An apparatus for sensing the type of fuel being added to a fuel tank according to claim 1 further comprising a solenoid operatively connected to said valve for opening and closing said valve.

5. A method for monitoring the addition of fuel to a fuel tank comprising the step(s) of:
    (a) installing a receiving-side filler neck such as the apparatus disclosed in claim 1 to a vehicle;
    (b) utilizing said apparatus to determine the vapor pressure of said fuel being added to said fuel tank; and
    (c) enabling or preventing the addition of said fuel to said fuel tank based on said determination of said apparatus.

6. An apparatus for sensing the type of fuel being added to a fuel tank according to claim 1 wherein said sensing unit is operatively connected to said valve actuator and configured to measure of said fuel being added to said fuel tank through said filler neck, comparing said exothermic energy measurement to predetermined exothermic energy data, and causing said valve actuator to close said valve if said comparison indicates the values are above or below said predetermined exothermic energy data.

7. An apparatus for sensing the type of fuel being added to a fuel tank according to claim 6 further comprising an alarm unit comprising a visual and audible alarm indicator, operating indicator, test and reset switches.

8. An apparatus for sensing the type of fuel being added to a fuel tank according to claim 6 further comprising a solenoid operatively connected to said valve for opening and closing said valve.

9. An apparatus for sensing the type of fuel being added to a fuel tank comprising:
   (a) a filler neck sized to permit insertion of a fuel nozzle and having a passageway to permit fuel to flow from said nozzle to said fuel tank;
   (b) a valve affixed across said filler neck passageway at a position to control the flow of fuel through said filler neck to said fuel tank;
   (c) a valve actuator operatively affixed to said valve to cause said valve to open and close said passageway depending upon a signal received from a sensing unit;
   (d) a vacuum pump configured to create a vacuum within said filler neck when said valve closes said passageway;
   (e) said sensing unit operatively connected to said valve actuator and configured to measure the exothermic energy produced by a reaction of a catalyst with said fuel being added to said fuel tank through said filler neck, comparing said exothermic energy measurement to predetermined exothermic energy data, and transmitting a signal to cause said valve actuator to open or close and to cause said vacuum pump to turn on or off depending upon the results of said comparison.

10. An apparatus for sensing the type of fuel being added to a fuel tank comprising:
   (a) a filler neck sized to permit insertion of a fuel nozzle and having a passageway to permit fuel to flow from said nozzle to said fuel tank;
   (b) a valve affixed across said filler neck passageway at a position to control the flow of fuel through said filler neck to said fuel tank;
   (c) a valve actuator operatively affixed to said valve to cause said valve to open and close said passageway depending upon a signal received from a sensing unit;
   (d) a vacuum pump configured to create a vacuum within said filler neck when said valve closes said passageway;
   (e) said sensing unit operatively connected to said valve actuator and configured to supply identification data about said fuel being added to said fuel tank through said filler neck, comparing said identification data to predetermined data, and transmitting a signal to cause said valve actuator to open or close and to cause said vacuum pump to turn on or off depending upon the results of said comparison.

11. An apparatus for sensing the type of fuel being added to a fuel tank according to claim 10, wherein said sensing unit is operatively connected to said valve actuator and configured to supply identification data about said fuel being added to said fuel tank through said filler neck, comparing said identification data to predetermined data, and causing said valve actuator to close said valve if said comparison indicates the values are above or below said predetermined data.

12. An apparatus for sensing the type of fuel being added to a fuel tank according to claim 11 further comprising an alarm unit comprising a visual and audible alarm indicator, operating indicator, test and reset switches.

13. An apparatus for sensing the type of fuel being added to a fuel tank according to claim 10 further comprising a solenoid operatively connected to said valve for opening and closing said valve.

14. An apparatus for sensing the type of fuel being added to a fuel tank according to claim 10 wherein said sensing unit is an infrared fuel detector.

* * * * *